Figure 2:
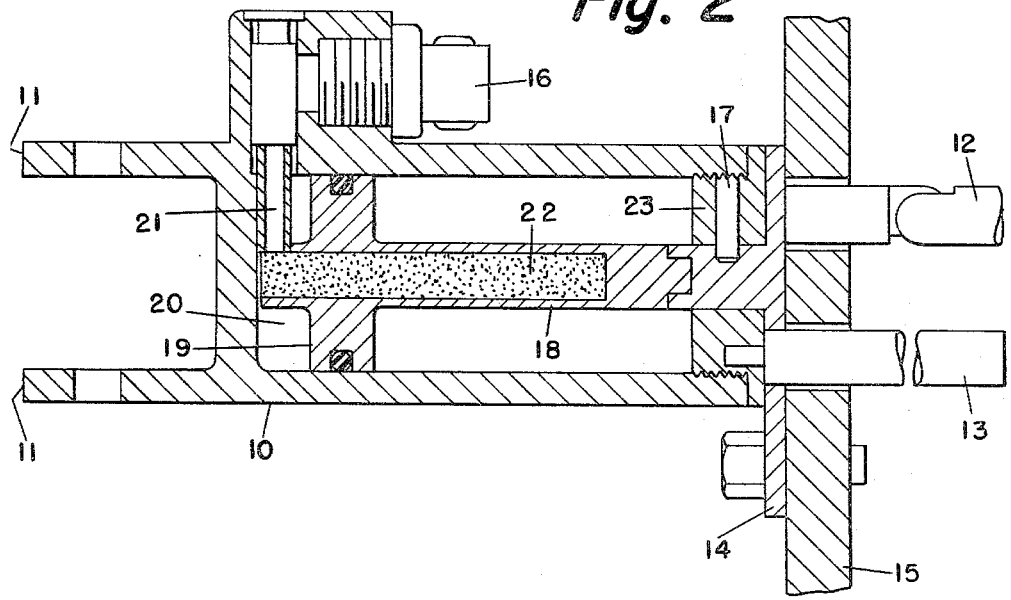

April 6, 1965   G. H. SKOPP ETAL   3,176,941
LOAD UNLOCKING AND ACTUATING THRUSTER
Filed Dec. 19, 1961   3 Sheets-Sheet 1
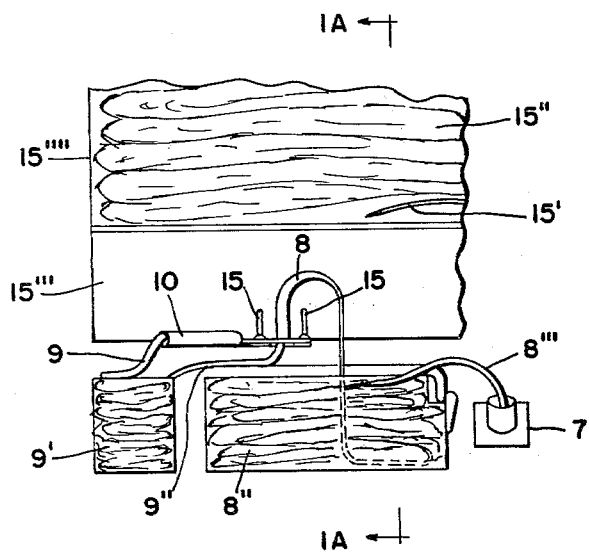
FIG. I.
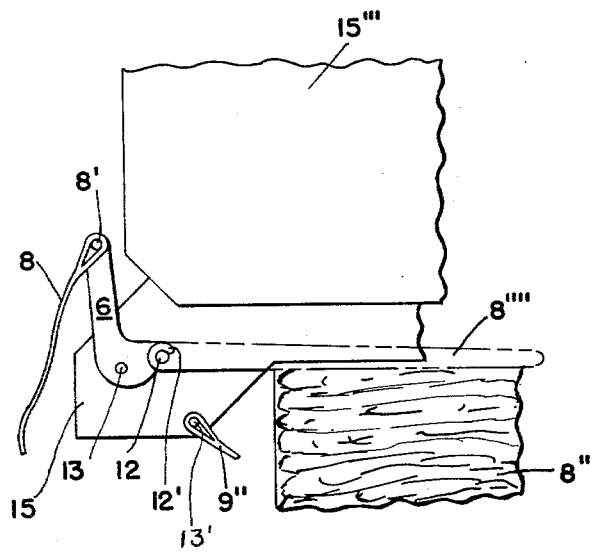
FIG. IA.
INVENTORS
GILBERT H. SKOPP
CHARLES W. BOAZ
BY
ATTORNEYS

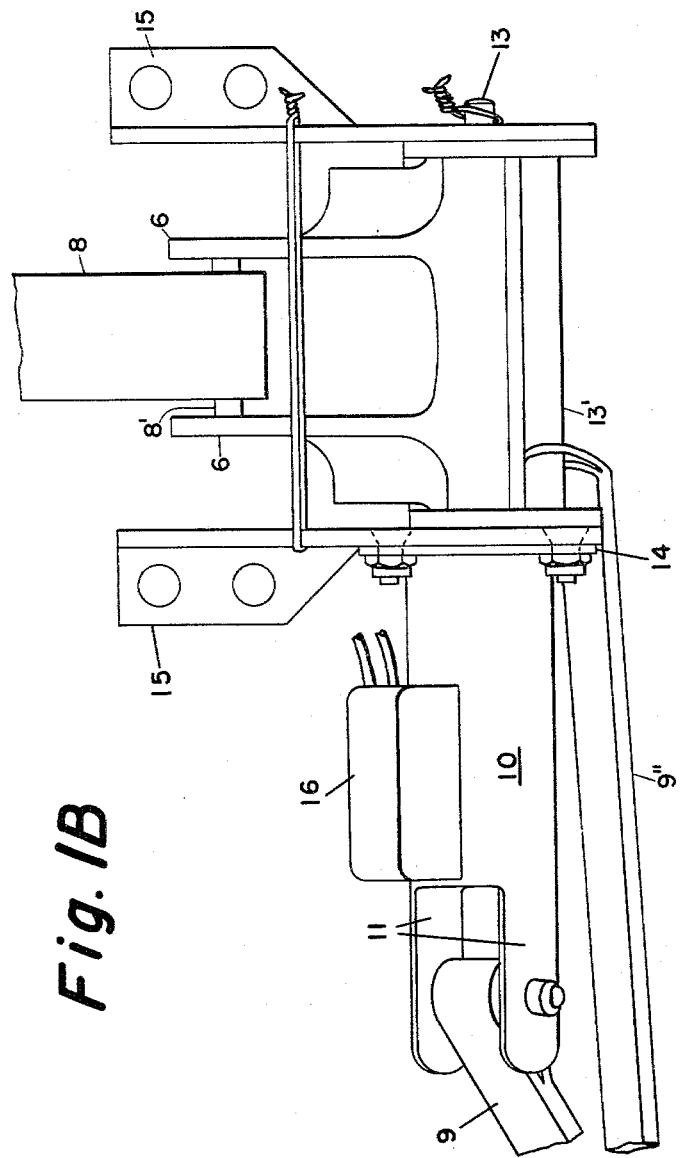

INVENTORS
GILBERT H. SKOPP
CHARLES W. BOAZ

United States Patent Office 3,176,941
Patented Apr. 6, 1965

3,176,941
LOAD UNLOCKING AND ACTUATING THRUSTER
Gilbert H. Skopp, Levittown, and Charles W. Boaz, Willow Grove, Pa., assignors to the United States of America as represented by the Secretary of the Army
Filed Dec. 19, 1961, Ser. No. 160,674
2 Claims. (Cl. 244—147)
(Granted under Title 35, U.S. Code (1952), sec. 266)

The invention described herein may be manufactured and used by or for the Government for governmental purposes without the payment to us of any royalty thereon.

This invention relates to thrusters of the gas pressure operated type, and more particularly to a thruster which is operable sequentially to unlock and actuate a load device such as the main parachute of an aircraft escape system.

In a well known type of aircraft escape system, a main parachute is normally operated by a drogue parachute and is operated by a pilot parachute in case the drogue parachute fails to function within a predetermined time. The drogue parachute is locked to the container of the main parachute by two pins. As a result, emergency operation of the main parachute involves withdrawal of these pins and the pulling out of the pilot parachute.

The problem of providing a thruster capable of effecting these results is complicated by the fact that the pins are close to one another and that the force for withdrawing them should be applied midway between them. This rules out the use of thrusters of the usual catapult type for the reason that the space between the pins restricts the size of the thruster tube to a size which is insufficient to provide the thrust required to pull out the pins and the pilot parachute.

The present invention solves this problem by the provision of a thruster which is movable in its entirety to actuate the pins and pilot parachute. This construction has the advantage that the space between the pins is no longer a limiting factor and the piston area and cylinder volume may be made such as to produce whatever thrust is required to actuate the pins and pilot parachute.

The invention will be better understood from the following description when considered in connection with the accompanying drawings and its scope is indicated by the appended claims.

Referring to the drawings:

FIG. 1 denotes a parachute deployment system embodying the principles of the invention, FIG. 1A is an enlarged partial section view taken along line 1A—1A of FIG. 1 and showing the main parachute actuating mechanism.

Figure 3:
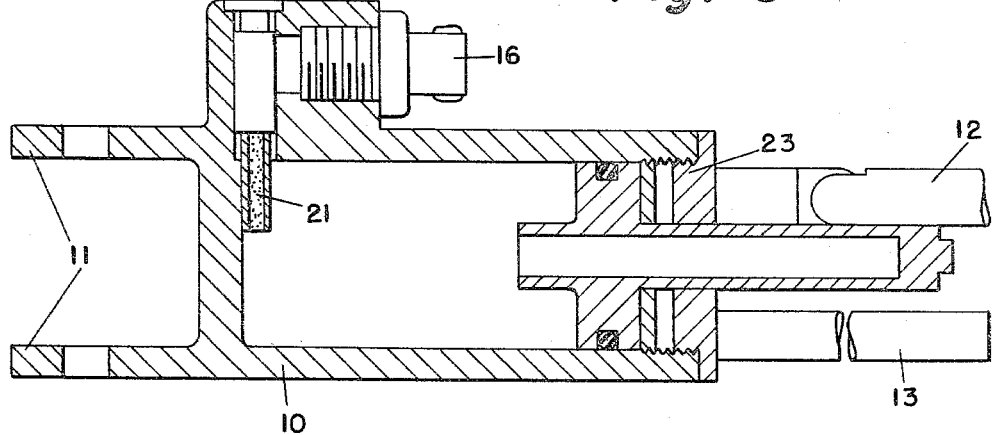

FIG. 1B is an enlarged view of the relation between the thruster and the associated parachute apparatus, FIG. 2 is a sectional view of the thruster in its standby condition, and FIG. 3 illustrates the thruster as in the condition in which it is ejected from its support.

As seen in FIG. 1, appropriate ignition means 7 are provided to actuate the drogue parachute 8″ through its lanyard 8‴. Upon normal operation of the drogue, the drogue chute riser 8 (FIGS. 1, 1A), which is in the form of a flexible strap material connected to the drogue, is pulled downwardly to move counter-clockwise (FIG. 1A) pin 8′ connecting pivoted lever 6 thereto. Lever 6 is in the form of a bell crank pivotally mounted on pin 13 and having a hook portion 12′ releasably latching about pin 12. Pin 12 passes through apertured main chute supports 15 and apertured drogue chute support 8″″ normally attached thereby. Supports 15 are rigidly connected to a pivotable door 15″″ of main chute container 15″″″ that actuates the main chute 15″ through its lanyard 15′. Continued force upon and counter-clockwise movement of bell crank pin 8′ will result in a downward force upon the left corner (FIG. 1A) of supports 15 and door 15‴ which opens about its pivot (not shown) at its right side.

Should the drogue chute apparatus fail to function, appropriate actuation of thruster unit 10 (FIGS. 1, 1B and 2) will simultaneously withdraw pins 12, 13 and release the drogue bell crank 6 while actuating pilot chute 9′ through its lanyard 9, such that the pilot chute riser 9″, which is secured to pin 13′ (FIGS. 1A, 1B) extending between supports 15, will actuate or counter-clockwisely pivot (FIG. 1A) the main chute door 15‴, thereby actuating the main chute 15″.

As indicated by 1B, 2 and 3, the thruster of the present invention has a body 10 at one end of which are a pair of lugs 11 for attaching it to a pilot parachute lanyard 9 and to the other end of which are fixed a pair of pins 12 and 13 which interlock the main parachute container 15 with the drogue parachute 8. The body 10 is mounted on a base 14 which is fixed to the container of the main parachute. At one side of the body 10 is an igniter 16 which functions upon the application of an electrical current to ignite the main propellant of the thruster as hereinafter explained.

As shown more clearly in FIG. 2, the base 14 is fixed to the body assembly 10 and 23 by a shear pin 17 and engages the end of a hollow rod 18. A piston 19, fixed to the other end of the rod 18, is adapted to move in the cylindrical body 10. Leading from the electrically operated igniter 16 to a chamber 20 at the rear of the piston 19 is a tube 21. This tube contains a black powder which functions to carry ignition to the main propellant 22 in the hollow piston rod 18.

In the operation of the thruster, the gas pressure between the body 10 and the piston 19 builds up in the chamber 20 until the force exerted on the effective area of the piston is great enough to shear the pin 17. When this happens, the body 10 moves away from the base 14 until the piston 19 strikes the internal shoulder 23 of the body. Thereupon the entire thruster is driven from the base carrying with it (1) the pins 12 and 13 which unlock the main parachute container from the drogue parachute, and (2) the pilot parachute lanyard 9 which pulls out pilot parachute which pulls out the main parachute.

While the present invention has been described as utilized in the operation of a plurality of parachutes, it is to be understood that it is applicable to other operations involving motions similar to those described above.

We claim:

1. In an aircraft escape system having a main parachute and a drogue parachute for normally operating the same,
    a container supporting said main parachute and having an apertured extension,
    a body member releasably connected to said container and having closely spaced pin means extending through said apertured extension and normally locking said main and drogue parachutes from relative movement, and
    a pilot parachute lanyard connected to said body member for actuating said main parachute should said drogue parachute be rendered ineffective,
    said body member including a body portion closed at one forward end adjacent said pilot lanyard and having centrally apertured flange means extending inwardly from said body, means including a flange slidable within said body portion and a rod aligned with said flange means central aperture for relative movement rearwardly therethrough when said body portion is moved forwardly, means normally restricting forward movement of said flange means away from said extension, and means including propellant and ignition means therefor for developing sufficient pressure between said body closed end and said slidable flange to provide relative movement therebetween upon rendering said restricting means ineffective, so constructed and arranged that when said pressure is developed, said body portion and lanyard will move forward to release said locking means and actuate said main parachute.

2. In an aircraft escape system having a main parachute and a drogue parachute for normally operating the same, a container supporting said main parachute and having an apertured extension, a body member releasably connected to said container and having closely spaced pin means extending through said apertured extension and normally locking said main and drogue parachutes from relative movement, and a pilot parachute lanyard connected to said body member for actuating said main parachute should said drogue parachute be rendered ineffective, said body member including a cylinder closed at one forward end and having at its other end a rearward internal flange connected to said pin means, said flange having a central opening, a piston in said cylinder containing propellant at its one forward end and having a rearwardly extending rod aligned with said opening, said extension having means secured thereto and extending forwardly through said opening, a shear pin normally securing said secured means to said flange and defining said releasable connection, and means adjacent said cylinder closed end for igniting said propellant, so constructed and arranged that upon ignition of said propellant, sufficient gas pressure will be produced between said one cylinder and piston ends to urge said rod against said secured means, fracture said shear pin, and move said cylinder and pin means forwardly of said extension, enabling said pilot lanyard to actuate said main parachute.

References Cited by the Examiner
UNITED STATES PATENTS

| | | | |
|---|---|---|---|
| 1,229,951 | 6/17 | Hatch | 60—39.47 |
| 2,798,683 | 7/57 | Swenson | 244—149 |
| 2,928,319 | 3/60 | Sokolowski | 60—26.1 |
| 3,034,289 | 5/62 | Stott | 60—26.1 |

FRED E. ENGELTHALER, *Primary Examiner.*

SAMUEL LEVINE, JULIUS E. WEST, *Examiners.*